United States Patent [19]

Klavemann et al.

[11] Patent Number: 5,649,500

[45] Date of Patent: Jul. 22, 1997

[54] APPARATUS FOR HOUSEBREAKING PETS

[76] Inventors: Trilby Klavemann, 1858 Highway 130, Bennett, Iowa 52721; John Kinyon, 2925 - 150th St., Muscatine, Iowa 52761

[21] Appl. No.: 533,903

[22] Filed: Sep. 26, 1995

[51] Int. Cl.⁶ .................................................. A01K 1/03
[52] U.S. Cl. ............................. 119/452; 119/484
[58] Field of Search ............................ 119/484, 452, 119/473, 501

[56] References Cited

U.S. PATENT DOCUMENTS

| | | | |
|---|---|---|---|
| D. 317,216 | 5/1991 | Cutrone | 119/484 X |
| 2,932,279 | 4/1960 | Giles. | |
| 3,738,322 | 6/1973 | Smith | 119/484 |
| 4,021,975 | 5/1977 | Calkins | 119/165 |
| 4,029,048 | 6/1977 | Gershbein | 119/165 |
| 4,224,899 | 9/1980 | Cruchelow et al. | 119/501 |
| 4,291,645 | 9/1981 | Cruchelow et al. | 119/484 |
| 4,445,459 | 5/1984 | Julie | 119/28.5 |
| 4,995,336 | 2/1991 | Deemer et al. | 119/484 |
| 5,148,767 | 9/1992 | Torchio | 119/484 |
| 5,165,366 | 11/1992 | Harvey et al. | 119/165 |
| 5,167,202 | 12/1992 | Bradford et al. | 119/452 |
| 5,195,457 | 3/1993 | Namanny | 119/484 |
| 5,261,350 | 11/1993 | Vavrek | 119/484 |

*Primary Examiner*—Robert P. Swiatek
*Assistant Examiner*—Yvonne R. Abbott
*Attorney, Agent, or Firm*—Henderson & Sturm

[57] ABSTRACT

An apparatus for housebreaking pets comprising an animal entrance installed in a standard door of a home and to which is removably secured an animal cage interior to the home. The end of the cage opposing the animal entryway is affixed with a hinged panel to provide easy access to within the cage to provide food and water for the pet housed therein. As domestic pets wish to avoid contact with their own excrement, the pets quickly learn to go outdoors to take care of their bodily functions rather than do so in the cage where they are otherwise confined. After only a short time, the animals become housebroken and the cage may be removed from the door.

2 Claims, 1 Drawing Sheet

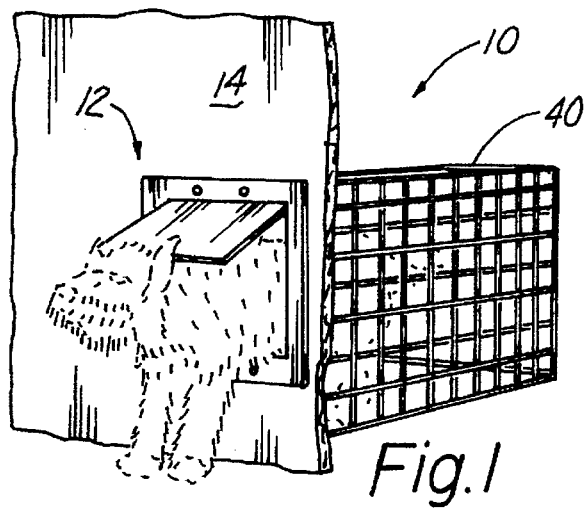
Fig. 1
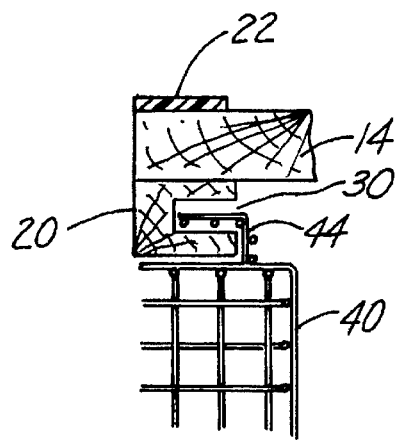
Fig. 4
Fig. 2
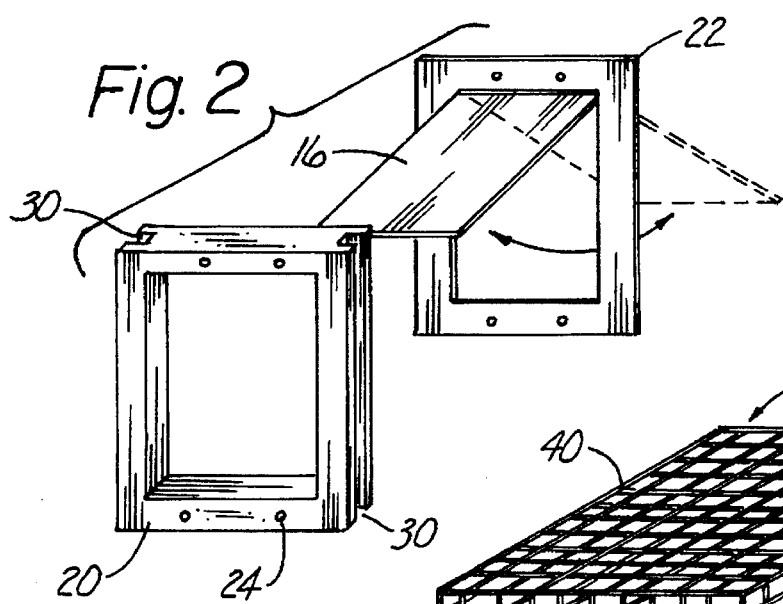
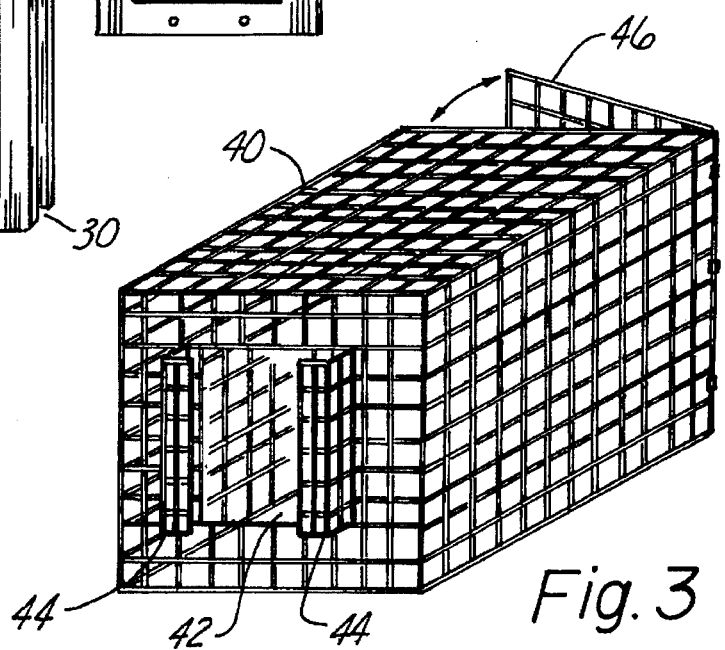
Fig. 3

APPARATUS FOR HOUSEBREAKING PETS

TECHNICAL FIELD

The present invention relates to training devices for animals, and more particularly to such devices directed to domestic pets.

BACKGROUND ART

The prior art is replete with shelters designed to give domestic animals such as cats and dogs access to the outdoors while remaining contained within some sort of enclosure. U.S. Pat. No. 5,148,767 to Torchio discloses such a device for mounting to a window frame, while U.S. Pat. No. 4,291,645 to Cruchelow et al. discloses a pet shelter to be mounted externally to a basement window opening. U.S. Pat. No. 5,261,350 to Vavrek discloses a pet enclosure which is mounted externally to a hole cut through an external wall in a house, while U.S. Pat. No. 5,165,366 to Harvey discloses a litter unit mounted to an outdoor window.

Also well known to the art are numerous designs for pet doors which are ordinarily installed within the door of a home and provide a hinged, swinging door which the pet may pass through to enter or leave the house.

While many of the prior art shelters contain litter boxes for the containment of animal excrement, and while of course the pet doors allow the pets to go outdoors when necessary to take care of their bodily functions, none of the prior art discloses an apparatus specifically designed to housebreak pets.

DISCLOSURE OF THE INVENTION

The present invention discloses an apparatus for housebreaking pets comprising an animal entrance installed in a standard door of a home and to which is removably secured an animal cage interior to the home. The end of the cage opposing the animal entryway is affixed with a hinged panel to provide easy access to within the cage to provide food and water for the pet housed therein. As domestic pets wish to avoid contact with their own excrement, the pets quickly learn to go outdoors to take care of their bodily functions rather than do so in the cage where they are otherwise confined. After only a short time, the animals become housebroken and the cage may be removed from the door.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the invention from outside the home, with the door of the home partially cutaway;

FIG. 2 depicts the interior and exterior frames of the pet door apparatus, as well as the door hinged to the exterior frame;

FIG. 3 is a perspective view of the detachable pet cage with hinged rear panel; and FIG. 4 is a partial top sectional view of the cage entryway flange engaging the channel of the interior frame.

BEST MODE FOR CARRYING OUT THE INVENTION

Referring now to the drawings, wherein like reference numerals designate identical or corresponding parts throughout the several views, the present invention is depicted at 10 in FIG. 1 where the pet door apparatus 12 is secured within a standard home door 14. The cage 40 of the invention is seen to extend to within the interior of the home. The swinging door 16 of the door apparatus 12 is hinged at the top as is well known in the art, and allows the door 16 to swing inward or outward under pressure by the pet.

The door apparatus 12 is comprised of an inner frame 20 and an outer frame 22 which are bolted together through apertures 24 to sandwich the home door 14 therebetween after a suitable hole has been cut through the home door 14. The door apparatus 12 may be fabricated from any number of materials, although molded plastic is preferred. The inner frame 20 is seen to include a pair of vertical channels 30 cut or formed within the outer edge of the left and right sides thereof.

The pet cage 40 is fairly standard but for the pet entryway 42 formed within one end as shown in FIG. 3. The opposing sides of the entryway 42 each have extending therefrom an L-shaped flange 44 for downward, sliding engagement with the vertical channels 30 of the inner frame 20. This means for engagement of a flange 44 and a channel 30 is clearly depicted in the top, sectional view of FIG. 4. The pet cage 40 is further fitted with a hinged panel 46 at the end opposite the pet entryway 42 to permit easy entry and exit from the cage and also to allow food and water to be placed within the cage and for cleaning.

While the invention has been described with a certain degree of particularity, it is manifest that many changes may be made in the details of construction and the arrangement of the components without departing from the spirit and scope of the invention. It is therefore to be understood that the invention is not limited to the embodiment set forth herein for purposes of exemplification, but is to be limited only by the scope of the appended claims, including the full range of equivalency to which each element thereof is entitled.

What is claimed is:

1. An apparatus for housekeeping pets, comprising:

(a) a pet door apparatus for installation within a door of a home, said pet door apparatus having an inner frame and an outer frame, said inner frame includes upper and lower sides and left and right sides, said left and right sides each having a vertical channel therein; and (b) an animal cage removably secured to said inner frame of said said pet door apparatus, said animal cage having an entryway in a first end thereof, said entryway having upper and lower edges and left and right edges, said left and right edges each having a vertical, L-shaped flange extending therefrom for engagement with said left and right vertical channels of said inner frame.

2. The apparatus as recited in claim 1, further comprising a hinged panel in said animal cage at an end opposing said pet door engagement end.

* * * * *